(12) United States Patent
White et al.

(10) Patent No.: US 12,536,121 B1
(45) Date of Patent: Jan. 27, 2026

(54) VOL COMPLIANT I2C ISOLATION SCHEME

(71) Applicant: Analog Devices International Unlimited Company, Limerick (IE)

(72) Inventors: Liam Joseph White, Patrickswell (IE); Mark Gerard Finnan, Mungret (IE)

(73) Assignee: Analog Devices International Unlimited Company, Limerick (IE)

( * ) Notice: Subject to any disclaimer, the term of this patent is extended or adjusted under 35 U.S.C. 154(b) by 0 days.

(21) Appl. No.: 18/826,683

(22) Filed: Sep. 6, 2024

(51) Int. Cl.
*G06F 13/40* (2006.01)
*G06F 13/42* (2006.01)

(52) U.S. Cl.
CPC ...... *G06F 13/4068* (2013.01); *G06F 13/4004* (2013.01); *G06F 13/42* (2013.01)

(58) Field of Classification Search
CPC ... G06F 13/4068; G06F 13/4004; G06F 13/42
USPC .......................................................... 710/301
See application file for complete search history.

(56) References Cited

U.S. PATENT DOCUMENTS

| | | | | |
|---|---|---|---|---|
| 5,266,849 A * | 11/1993 | Kitahara | .......... | H03K 19/09429 326/62 |
| 6,195,306 B1 * | 2/2001 | Horiguchi | ................ | G11C 8/12 365/230.03 |
| 6,366,506 B1 * | 4/2002 | Mizuno | .................... | G11C 5/14 365/189.09 |
| 6,407,402 B1 * | 6/2002 | Ghaseminejad | .... | H04L 25/0266 250/214 R |
| 6,909,307 B2 * | 6/2005 | Mitarashi | ........... | H03K 19/0175 710/110 |
| 6,944,695 B1 * | 9/2005 | Tangen | ................ | G06F 13/4282 710/110 |
| 9,705,482 B1 * | 7/2017 | Englekirk | .......... | H03K 17/6871 |
| 9,875,152 B2 | 1/2018 | Kessler | | |
| 10,872,049 B2 | 12/2020 | Kessler et al. | | |
| 11,094,688 B2 | 8/2021 | Tanghe et al. | | |
| 11,119,971 B1 * | 9/2021 | Singh | .................. | G06F 13/4282 |
| 12,341,514 B1 * | 6/2025 | Ilislamoo | ................ | H03K 19/23 |
| 2004/0174202 A1 * | 9/2004 | Behzad | ................ | H03D 7/1441 327/359 |
| 2004/0257742 A1 * | 12/2004 | Zeller | .................... | H02H 9/043 361/118 |
| 2006/0212634 A1 | 9/2006 | Reay et al. | | |

(Continued)

*Primary Examiner* — Christopher B Shin
(74) *Attorney, Agent, or Firm* — Schwegman Lundberg & Woessner, P.A.

(57) ABSTRACT

Described herein are devices, methods and techniques for preventing communication blockage caused by latching in directional isolated buffers while also complying with the requirements of various communication protocols such as I²C, SMBus and PMBus. These devices use techniques based on digital state machines to comply with the requirements of these communication protocols. The digital state machines are configured to extend the time interval in which the voltage appearing at a bus of the bidirectional isolated buffer as a result of transmission of data from an external driver is within the voltage dead zone. This allows the device to determine whether the external peripheral has initiated transmission of data directed to the external driver—thus preventing communication blockage due to latching—without requiring that the user interpret a voltage appearing at a bus as a logic 0 despite being larger than the VOL specification.

20 Claims, 6 Drawing Sheets

(56) References Cited

U.S. PATENT DOCUMENTS

| | | | |
|---|---|---|---|
| 2008/0046627 A1* | 2/2008 | Castro | G06F 13/4031 |
| | | | 710/313 |
| 2011/0128661 A1* | 6/2011 | Wiese | H04L 12/413 |
| | | | 361/119 |
| 2011/0289248 A1* | 11/2011 | Djabbari | G06F 13/4256 |
| | | | 710/110 |
| 2016/0335210 A1* | 11/2016 | Yan | G06F 13/362 |
| 2020/0097418 A1* | 3/2020 | Lendvay | G06F 13/1668 |
| 2024/0280627 A1* | 8/2024 | Kohvakka | G01R 31/2812 |
| 2025/0200319 A1* | 6/2025 | Feldhofer | G06K 19/0715 |

* cited by examiner

VOL COMPLIANT I2C ISOLATION SCHEME

BACKGROUND

Field

The present application relates to bidirectional isolated buffers.

Related Art

Galvanic isolation between circuit components and transmission of data and power across an isolation barrier is often provided for safety and/or data integrity considerations. Galvanic isolation is intended to prevent extraneous signals from inadvertently being processed as status or control information and and/or to protect electronic equipment from shock hazards or to permit the equipment on each side of an isolation barrier to be operated at a different supply voltage.

BRIEF SUMMARY

Described herein are devices, methods and techniques for preventing communication blockage caused by latching in directional isolated buffers while also complying with the requirements of various communication protocols such as I²C, SMBus and PMBus. These devices use techniques based on digital state machines to comply with the requirements of these communication protocols. The digital state machines are configured to extend the time interval in which the voltage appearing at a bus of the bidirectional isolated buffer as a result of transmission of data from an external driver is within the voltage dead zone. This allows the device to determine whether the external peripheral has initiated transmission of data directed to the external driver-thus preventing communication blockage due to latching-without requiring that the user interpret a voltage appearing at a bus as a logic 0 despite being larger than the VOL specification.

Some embodiments relate to an isolated device comprising a bidirectional isolated buffer having a first side and a second side; a first bus coupled to the first side of the bidirectional isolated buffer and a second bus coupled to the second side of the bidirectional isolated buffer; a first switch coupled to the first bus and a second switch coupled to the second bus; a first voltage limiter coupled to the first bus; and a controller configured to, responsive to detection of a variation in a first voltage appearing at the first bus caused by a first external device coupled to the first bus, control the first voltage limiter to reduce a rate of the variation in the first voltage appearing at the first bus.

Some embodiments relate to an isolated device comprising a bidirectional isolated buffer having a first side and a second side; a first bus coupled to the first side of the bidirectional isolated buffer and a second bus coupled to the second side of the bidirectional isolated buffer; a first switch coupled to the first bus and a second switch coupled to the second bus; and a first voltage limiter coupled to the first bus and a second voltage limiter coupled to the second bus, wherein each of the first and second voltage limiters is configured to, upon being activated, reduce a variation rate in a voltage appearing at the respective bus.

Some embodiments relate to a method for controlling an isolated device having a bidirectional isolated buffer having a first side and a second side, a first bus coupled to the first side of the bidirectional isolated buffer and a second bus coupled to the second side of the bidirectional isolated buffer, a first switch coupled to the first bus and a second switch coupled to the second bus, the method comprising responsive to detection of a variation in a first voltage appearing at the first bus caused by a first external device coupled to the first bus, controlling a first voltage limiter to reduce a rate of the variation in the first voltage appearing at the first bus, and responsive to a variation in a second voltage appearing at the second bus caused by opening of the second switch, controlling a second voltage limiter to reduce a rate of the variation in the second voltage appearing at the second bus.

BRIEF DESCRIPTION OF DRAWINGS

Various aspects and embodiments of the application will be described with reference to the following figures. It should be appreciated that the figures are not necessarily drawn to scale. Items appearing in multiple figures are indicated by the same reference number in all the figures in which they appear.

DETAILED DESCRIPTION

Described herein are devices, methods and techniques for preventing communication blockage caused by latching in directional isolated buffers while also complying with the requirements of various communication protocols such as I²C, SMBus and PMBus.

The I²C protocol, also referred to as Inter-Integrated Circuit or I²C, is a synchronous, multi-master, multi-slave, packet-switched, single-ended, serial communication bus. It is often used for communication between integrated circuits (ICs) and other electronic components within a device. I²C commonly uses only two bidirectional open-drain lines, a Serial Data Line (SDA) and a Serial Clock Line (SCL), for communication. I²C supports multiple master devices and multiple slave devices. The master initiates communication, generates clock signals, and controls the data transfer. Slaves respond to the master's commands. I²C is widely used in embedded systems, microcontrollers, sensors, EEPROMs, and other peripherals for low-speed, short-distance communication. Its simplicity and efficiency make I²C a popular choice for interconnecting components within electronic devices, particularly in situations where many devices need to communicate using only a few pins. The SMBus (System Management Bus) and PMBus (Power Management Bus)

protocols are specialized implementations based on the I²C protocol, designed to meet specific requirements in system management and power management. Both protocols are essentially a subset of I²C with additional specifications for system management tasks. As such, they both maintain compatibility with I²C devices, although they define stricter electrical and timing requirements. SMBus was developed to provide a communication link between various system components such as the motherboard, battery, and other peripherals. It is widely used in personal computer systems for power management and system health monitoring. PMBus is an extension of the SMBus protocol specifically designed for power management applications. Among other parameters, these protocols define VOL, VOH, VIL and VIH and the voltage dead zone. VOL is the maximum voltage level that a digital output pin can produce when it is in a logical low state (typically representing a logic 0). VOH is the minimum voltage level that a digital output pin can produce when it is in a logical high state (typically representing a logic 1). VIL is the maximum voltage level that a digital input pin will recognize as a logical low state. VIH is the minimum voltage level that a digital input pin will recognize as a logical high state. The dead zone, also known as the undefined region, is the voltage range between VIL and VIH where the input state is not defined as either low or high. Within this region, the behavior of digital circuits can be unpredictable, leading to potential errors. In one example, VOL and VIL are between 0.2 V and 0.5 V and VOH and VIH are between 0.7 V and 1 V.

The inventors have recognized and appreciated that conventional techniques for preventing communication blockage caused by latching in directional isolated buffers are not compliant with the requirements of these widely used communication protocols, placing a significant burden on the user to properly interpret the data received on either side of the isolation barrier. For example, some conventional techniques require that, responsive to transmission of a logic 0 by an external driver, the user interpret a voltage appearing at a bus as a logic 0 despite being larger than the VOL specification—the maximum voltage level defined by the protocols that a digital output pin can produce when it is in a logical low state. Requiring a user to interpret a voltage level in this way represents a violation of the protocol, limiting the usability of these techniques.

The devices developed by the inventors and described herein use techniques based on digital state machines to comply with the requirements of these communication protocols. As described in detail further below, the digital state machines are configured to extend the time interval in which the voltage appearing at a bus of the bidirectional isolated buffer as a result of transmission of data from an external driver is within the voltage dead zone. This allows the device to determine whether the external peripheral has initiated transmission of data directed to the external driver—thus preventing communication blockage due to latching-without requiring that the user interpret a voltage appearing at a bus as a logic 0 despite being larger than the VOL specification.

Figure 1:
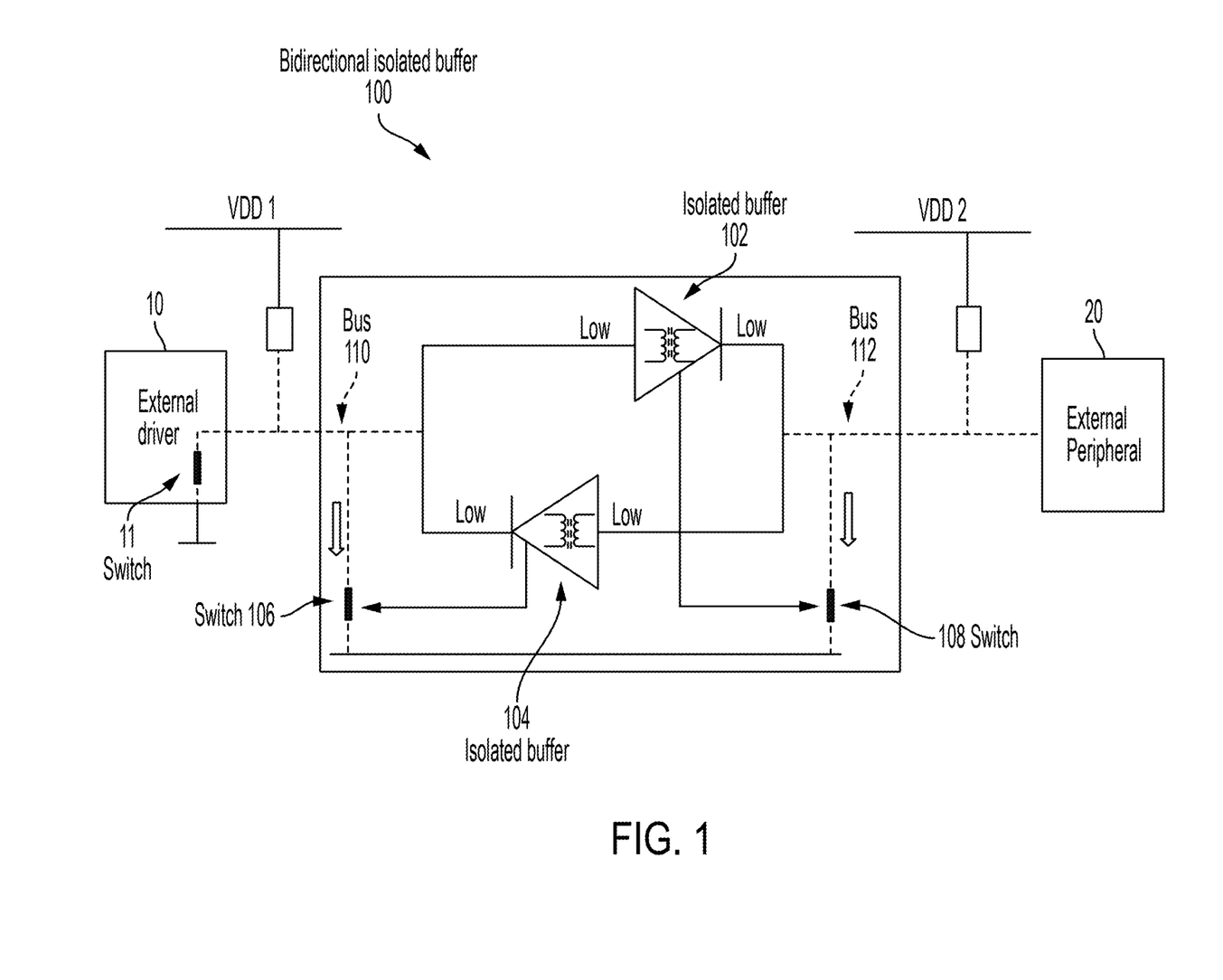
FIG. 1 is a block diagram of a bidirectional isolated buffer.

Communication blockage caused by latching occurs when, following the transmission of data by a first external device (e.g., an external driver) directed to a second external device (e.g., an external peripheral), the isolated device is unable to determine whether or not the second external device has initiated a transmission directed to the first external device. Consider the example of FIG. 1, showing a block diagram of a bidirectional isolated buffer 100. Bidirectional isolated buffer 100 includes a pair of isolated buffers. Of these, isolated buffer 102 is configured to support isolated transmission of data from an external driver 10 to an external peripheral 20 and isolated buffer 104 is configured to support isolated transmission of data from external peripheral 20 to external driver 10. Bus 110 couples external driver 10 to the input of isolated buffer 102 and the output of isolated buffer 104. Similarly, bus 112 couples external peripheral 20 to the input of isolated buffer 104 and the output of isolated buffer 102. The buses of the types described herein (e.g., buses 110 and 112) include conductive materials configured to support propagation of electrical signals. The buses may be implemented in any of numerous ways, including for example as conductive connections, conductive wires, conductive traces, conductive strips or any combination thereof, that electrically connect different points of a circuit together. In one example, a bus is defined by patterning (e.g., photolithographically) a layer of conductive material formed on a surface of an integrated circuit or a circuit board. The conductive material may be aluminum, copper, tungsten, silver or gold, among other possible candidates. Isolated buffer 102 controls the state of a switch (108) that couples bus 112 to ground, whereas isolated buffer 104 controls the state of another switch (106) that couples bus 110 to ground. Each switch, when closed, electrically pulls the respective bus to ground and, when open, allows the voltage appearing at the respective bus to vary depending on the state of the respective external device.

Consider the scenario in which external driver 10 initiates the transmission of a logic 0, which is performed by closing switch 11 (a switch that is part of external driver 10). Closing switch 11 results in the voltage appearing at bus 110 to pulled down to 0. The voltage appearing at bus 110 propagates through isolated buffer 102, which in turn sets the state of switch 108 to closed. Closing switch 108, in turn, results in the voltage appearing at bus 112 to be pulled down to 0. The voltage appearing at bus 112 propagates through isolated buffer 104, which in turn sets the state of switch 106 to closed. At this point, bus 110 is said to be latched. The latched state occurs because switch 106, being closed, will maintain the voltage appearing at bus 110 low even if external driver 10 subsequently attempts to transmit a logic 1 (by opening switch 11). In this scenario, communication between external drive 10 and external peripheral 20 is said to be blocked—the bidirectional isolated buffer, upon being latched, is unable to determine whether external peripheral has initiated transmission of data.

Conventional techniques for addressing this issue introduce a voltage offset in the voltage appearing at bus 110 (which can be achieved by introducing an impedance connected to switch 106). The voltage offset, if larger than the VOL specification, prevents the bus from being latched to 0. As noted above, however, this approach presents a major drawback in that it requires that, responsive to transmission of a logic 0 by an external driver, the user interpret a voltage appearing at a bus as a logic 0 despite being larger than the VOL specification.

Figure 2A:
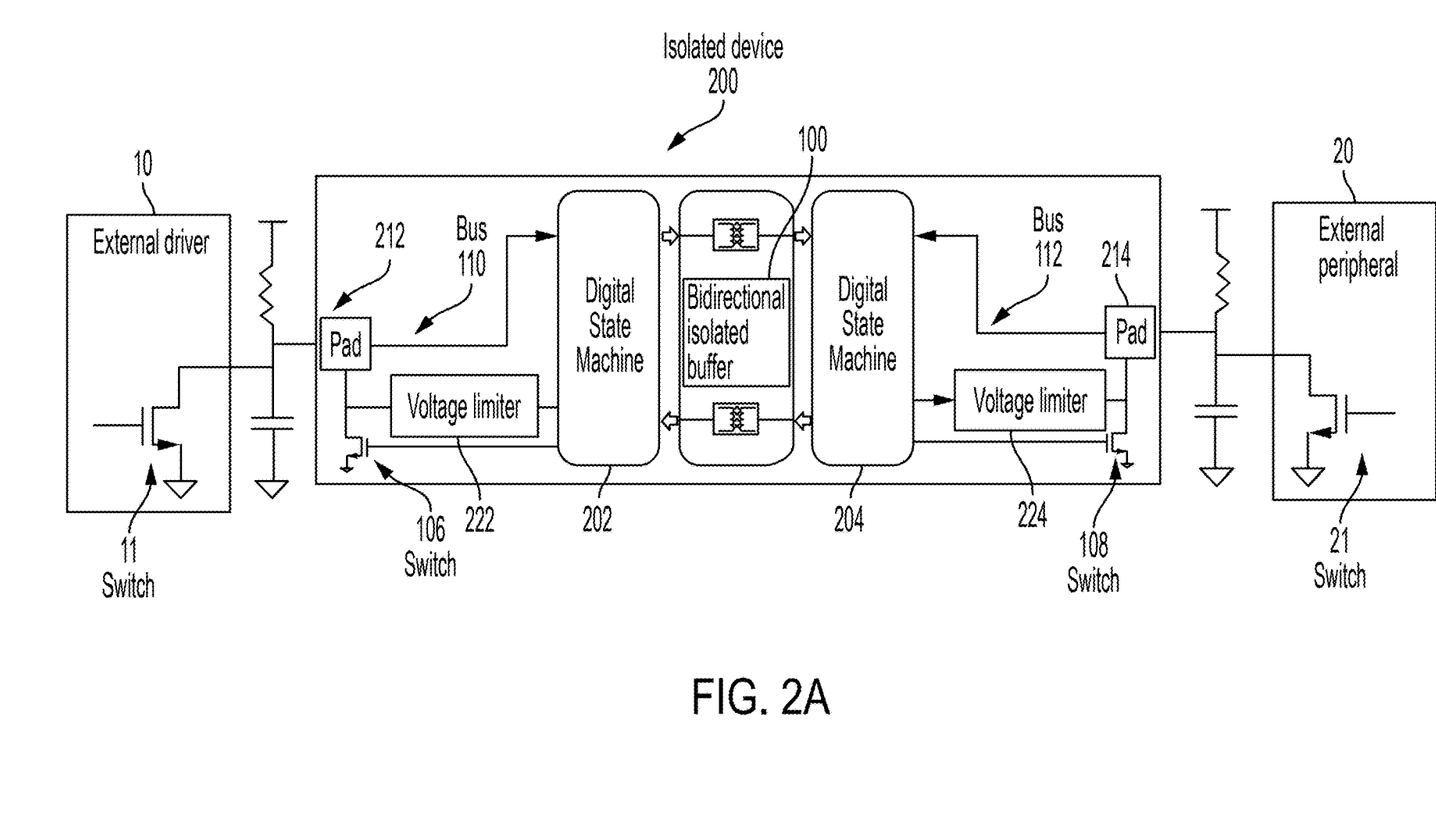
FIG. 2A is a block diagram of a bidirectional isolated buffer including first and second voltage limiters, in accordance with some embodiments.

Instead of relying on voltage offsets as in conventional approaches, the isolated devices developed by the inventors address communication blockage otherwise caused by latching by extending the time interval in which the voltage appearing at a bus of the bidirectional isolated buffer as a result of transmission of data from an external driver is within the voltage dead zone. An example of such as a device is shown in FIG. 2A. As in FIG. 1, an external driver 10 communicates with an external peripheral 20 using an isolated device (200). Isolated device 200 includes a bidirectional isolated buffer (100) similar to the bidirectional isolated buffer of FIG. 1. A pad 212 connects external driver 10 to bus 110 and a pad 214 connects external peripheral 20 to bus 112. As in FIG. 1, a switch 106 couples bus 110 to ground and a switch 108 couples bus 112 to ground.

In addition, the isolated device of FIG. 2A further includes voltage limiters 222 and 224, and digital state machines 202 and 204. Digital state machines 202 and 204 may be part of a controller having a memory storing computer instructions that, when executed, perform a method for controlling voltage limiters 222 and 224.

Figure 2B:
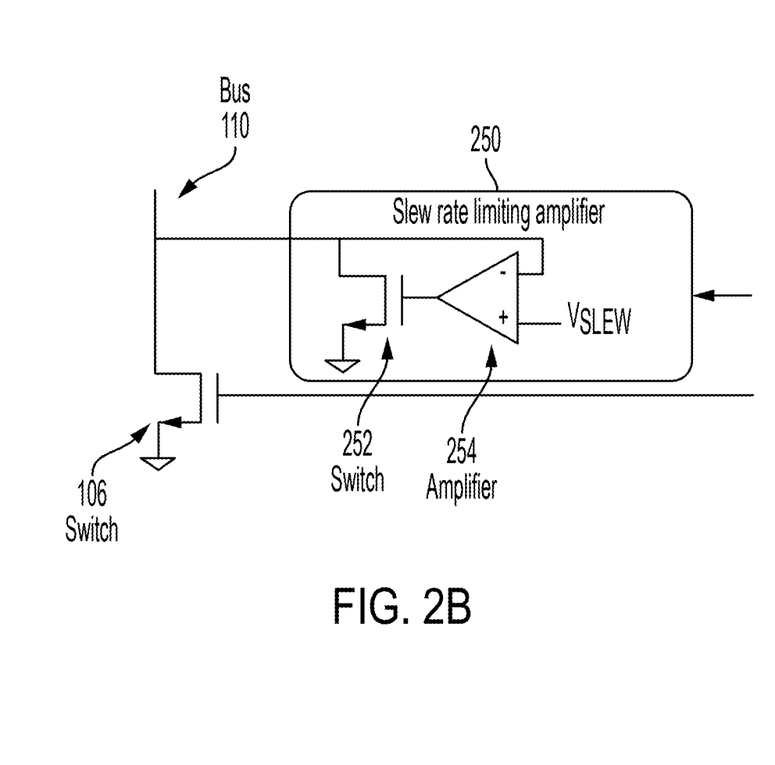
FIG. 2B is a circuit diagram illustrating a representative implementation of the first voltage limited of FIG. 2A, in accordance with some embodiments.
Figure 2C:
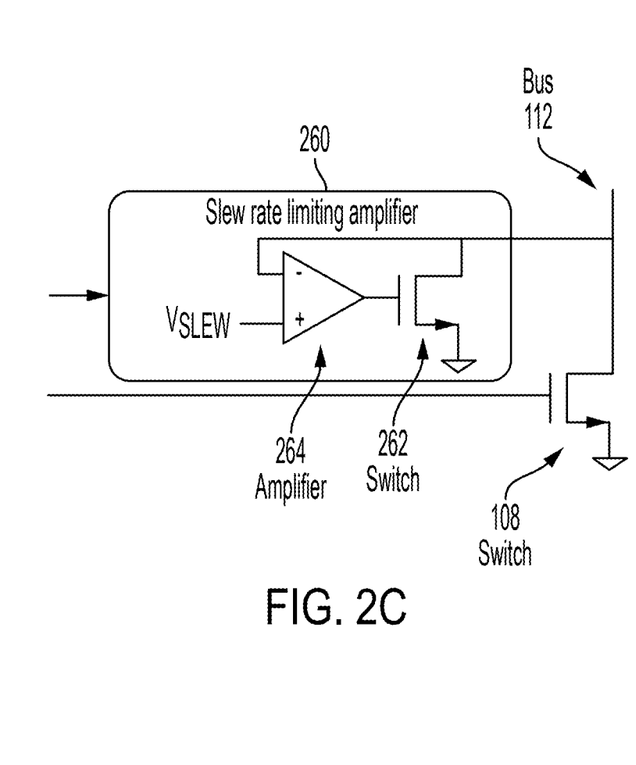
FIG. 2C is a circuit diagram illustrating a representative implementation of the second voltage limited of FIG. 2A, in accordance with some embodiments.

Voltage limiter 222 couples bidirectional isolated buffer 100 to bus 110 while voltage limiter 224 couples bidirectional isolated buffer 100 to bus 112. As discussed in detail further below, the voltage limiters are configured to reduce the rate of variation (e.g., rise) experienced by the voltage appearing at the respective bus so as to extend the time interval in which the voltage is within the voltage dead zone. The voltage limiters may be implemented in any of numerous ways. As an example, the voltage limiters may be implemented as voltage clamps. In this example, responsive to an increase in the voltage appearing at the respective bus that exceeds the VOL requirement, the voltage limiter maintains the voltage at some constant value within the voltage dead zone for a certain period of time. As another example, the voltage limiters may be implemented as slew rate limiting amplifiers, examples of which are shown in FIGS. 2B and 2C. The slew rate limiting amplifier of FIG. 2B (250) represents a potential implementation of voltage limiter 222 whereas the slew rate limiting amplifier of FIG. 2C (260) represents a potential implementation of voltage limiter 224. Slew rate limiting amplifier 250 includes an amplifier 254 coupled to a switch 252, the state of which (open vs. closed) is controlled by digital state machine 202. Similarly, slew rate limiting amplifier 260 includes an amplifier 264 coupled to a switch 262, the state of which is controlled by digital state machine 204. The slew rate limiting amplifiers are configured so that, responsive to a variation (e.g., a rise) in the voltage appearing at the respective bus, they reduce the rate of the variation from a first slope to a second slope. Examples are shown further below.

Figure 3:
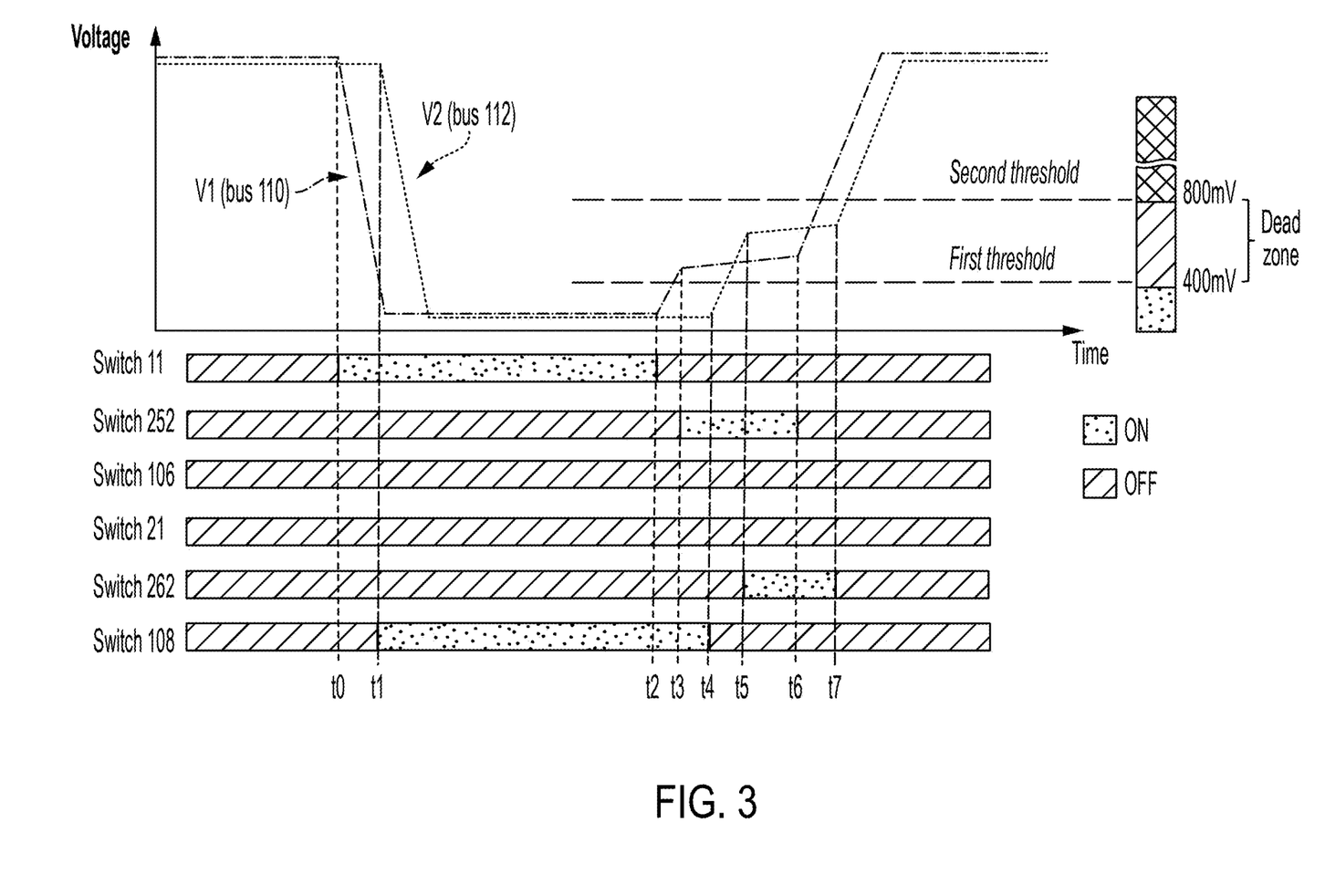
FIG. 3 is a plot illustrating voltages appearing at a pair of buses of the bidirectional isolated buffer of FIG. 2A, in accordance with some embodiments.
Figure 4:
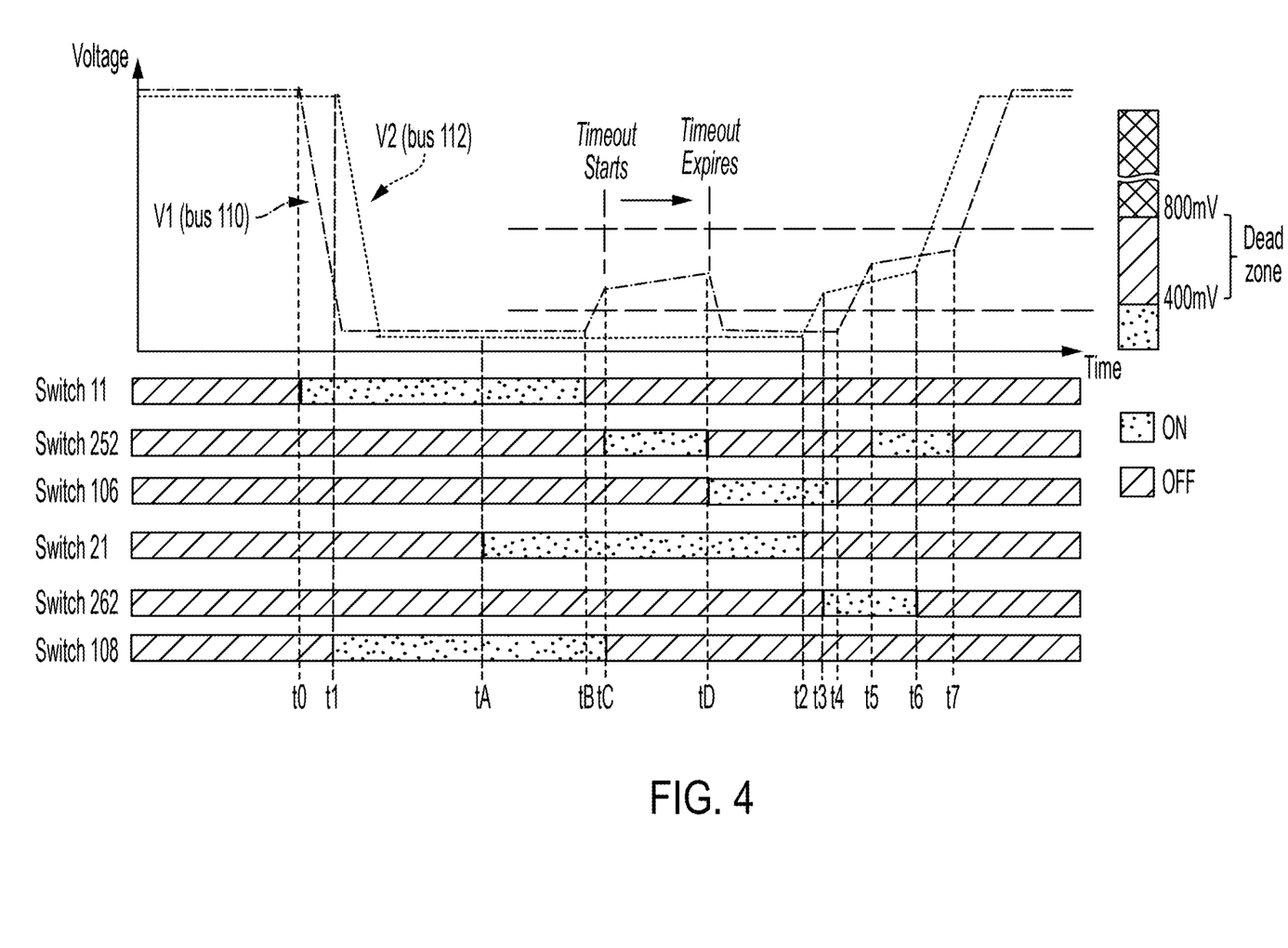
FIG. 4 is another plot illustrating voltages appearing at the same pair of buses of the bidirectional isolated buffer of FIG. 2A, in accordance with some embodiments.

FIGS. 3 and 4 are plots illustrating voltages appearing at buses 110 and 112 in response to transmission of a logic 0 by external driver 10, in accordance with some embodiments. FIGS. 3 and 4 further illustrate the state of the external switches (11 and 21), the state of the internal switches (106 and 108) and the state of the switches of the voltage limiters (252 and 262). Both plots illustrate voltages as a function of time, and further include a bar indicating where the plotted voltages lie with respect to the voltage thresholds (e.g., VOL and VIL) and the voltage dead zone defined by the applicable protocol. In this example, the first voltage threshold is set to 400 mV and the second threshold volage is set to 800 mV, although not all embodiments are limited to these specific values. In both figures, a switch is said to be in the "ON" state when is closed (thereby allowing current to flow through it), and is said to be in the "OFF" state when is open (thereby blocking the current).

The plots differ in that, in the scenario of FIG. 3, external peripheral 20 does not initiate a transmission following the transmission by the external driver 10, whereas the scenario of FIG. 4 involves a transmission by external peripheral 20 following the transmission by external driver 10. As discussed below, isolated device 200 is configured to determine whether external peripheral 20 has in fact initiated a transmission (as shown in FIG. 4) or has not (as shown in FIG. 3), thereby preventing latching of either bus.

It should be noted that the bits produced by the external peripheral may be transmitted either as an acknowledgment of reception of the data transmitted by the external driver or as part of an independent data stream.

Referring first to FIG. 3, the sequence begins when external driver 10 closes switch 11 at time t0. This occurs as a result of external driver 10 wanting to transmit a logic 0 to external peripheral 20. Before t0, the voltages appearing at buses 110 and 112 are well above the second voltage threshold. Following the closing of switch 11, the voltage appearing at bus 110 decreases until it reaches the minimum value (e.g., 0). This is because switch 11 pulls bus 110 to ground. The voltage of bus 110 propagates through bidirectional isolated buffer 100. At t1, isolated buffer 102 closes switch 108, thereby pulling bus 112 to ground. The result is that the voltage appearing at bus 112 trails the voltage appearing at bus 110. The voltages remain virtually constant until t2, when external driver 10 opens switch 11. This occurs as a result of external driver 10 wanting to transmit a logic 1 to external peripheral 20. Following the opening of switch 11 at t2, the voltage appearing at bus 110 increases at a certain rate. Without intervention by voltage limiter 222, the voltage would continue to rise and would eventually cross the second voltage threshold. This is what happens in conventional isolated devices that rely on voltage offsets. However, when it is detected that the voltage at bus 110 has crossed the first threshold, a controller implementing digital state machine 202 closes switch 252 at time t3. This activates voltage limiter 222, causing a reduction in the rising rate of the voltage appearing at bus 110. Thus, following t3, the voltage rises with a slope that is less than the slope exhibited by the voltage between t2 and t3 (the slope following t3 may be zero in embodiments in which the voltage limiter is implemented as a voltage clamp). Activation of voltage limiter 222 results in an extension of the time interval in which the voltage of bus 110 is within the voltage dead zone (defined between 400 mV and 800 mV in this example). As discussed below in connection with FIG. 4, extending this time interval allows the system to determine whether external peripheral 20 has initiated a transmission, thus preventing latching.

At time t4, upon propagation of the voltage of bus 110 through bidirectional isolated buffer 100, isolated buffer 102 opens switch 108, allowing the voltage appearing at bus 112 to rise. At time t5, responsive to the rise experienced by the voltage of bus 112 caused by opening switch 108, a controller implementing digital state machine 204 closes switch 262. This activates voltage limiter 224, causing a reduction in the rising rate of the voltage appearing at bus 112. Thus, following t5, the voltage rises with a slope that is less than the slope exhibited by the voltage between t4 and t5 (as noted previously, the slope following t5 may be zero in embodiments in which the voltage limiter is implemented as a voltage clamp). As for voltage limiter 222, activation of voltage limiter 224 results in an extension of the time interval in which the voltage of bus 112 is within the voltage dead zone.

At time t6, after a predefined period has passed from time t3, the controller implementing digital state machine 202 opens switch 252. The result is that the voltage appearing at bus 110 resumes to rise in accordance with its original (pre-t3) rate, thus crossing the second threshold. At time t7, upon propagation of the voltage of bus 110 through bidirectional isolated buffer 100, isolated buffer 102 opens switch 262, allowing the voltage appearing at bus 112 to rise with a rate similar to that of the voltage at bus 110 after t6.

The sequence plotted in FIG. 4 begins and ends with a pattern similar to that plotted in FIG. 4. As such, the events occurring at times t0, t1, t2, t3, t4, t5, t6 and t7 resemble those described above in connection with FIG. 3, although the roles of bus 110 and bus 112 are swapped following time t2 (i.e., this time bus 110 trails bus 112). The main difference between the sequences of FIG. 3 and FIG. 4 is that, between t1 and t2, external peripheral 20 initiates the transmission of a logic 0 (at time tA). Thus, external peripheral 20 closes switch 21 at tA. At time tB, external driver 10 opens switch 11, allowing the voltage appearing at bus 110 to rise. Similar to the scenario discussed above, when it is detected that the voltage at bus 110 has crossed the first threshold, the controller implementing digital state machine 202 closes switch 252 at time tC. This reduces the rate at which the voltage of bus 110 rises following tC. Additionally, at tC, the controller starts a timeout routine. As part of the routine, the controller determines whether an event occurs between the timeout start and the timeout expiration. The interval between the timeout start and the timeout expiration may have a predefined duration. The event that the controller looks out for is whether the voltage appearing at bus 112 has crossed the first threshold. If the controllers detects that the voltage of bus 112 has not crossed the first threshold (as in FIG. 4), then it concludes that external peripheral 20 has initiated the transmission of a logic 0. At tD, the controller closes switch 106. The events occurring subsequently (t2, t3, t4, t5, t6 and t7) reflect the transmission of a logic 0 by external peripheral 20. Vice versa, if the controllers detects that the voltage of bus 112 has crossed the first threshold (unlike in FIG. 4), then it concludes that external peripheral 20 has not initiated the transmission of a logic 0. In sum, this routine allows the isolated device to determine whether the external peripheral has initiated a transmission.

Figure 5:
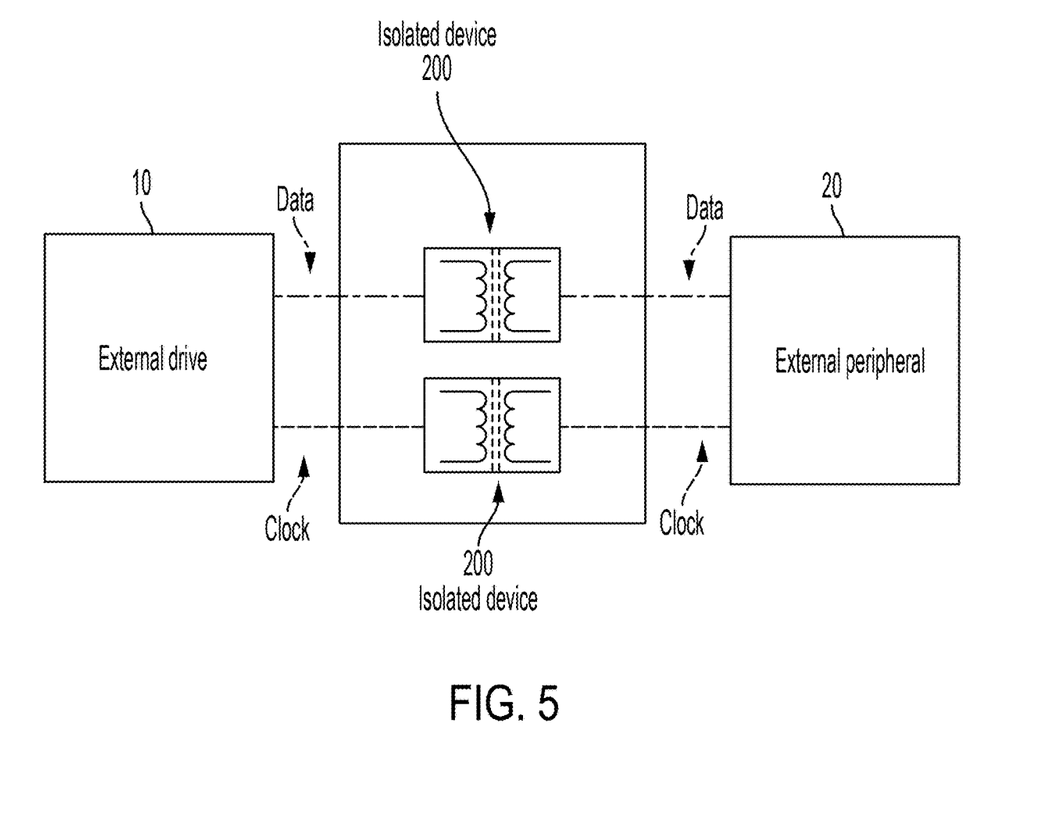
FIG. 5 is a block diagram of an apparatus including a first isolated device supporting propagation of data between an external driver and an external peripheral and a second isolated device supporting propagation of clock between the external driver and the external peripheral, in accordance with some embodiments.

The isolated devices and related techniques have been described in the context of transmission of data. Similar schemes may be applied to the transmission of clock. In some embodiments, an isolated device may support a Serial Data Line (SDA) as well as a Serial Clock Line (SCL). A representative scheme supporting both lines is shown in FIG. 5. In this example, one isolated device supports propagation of data and another isolated device supports propagation of clock. The clock may be used to time the sampling of the voltages appearing at the buses. To prevent latching, devices and techniques similar to those described above may be applied to the SCL (in addition to the SDA).

Accordingly, some embodiments relate to an isolated device (e.g., 200) comprising a bidirectional isolated buffer (e.g., 100) having a first side and a second side, and a first bus (e.g., 110) coupled to the first side of the bidirectional isolated buffer and a second bus (e.g., 112) coupled to the second side of the bidirectional isolated buffer. The isolated device may further comprise a first switch (e.g., 106) coupled to the first bus and a second switch (e.g., 108) coupled to the second bus. The isolated device may further comprise a first voltage limiter (e.g., 222) coupled to the first bus. A controller may be configured to, responsive to detection of a variation (e.g., rise) in a first voltage appearing at the first bus caused by a first external device (e.g., 10) coupled to the first bus, control the first voltage limiter to reduce a rate of the variation in the first voltage appearing at the first bus. For example, responsive to detecting a rise in the voltage of bus 110 (e.g., as discussed in connection with time t2 of FIG. 3), the controller may activate voltage limiter 222 to reduce the rising rate of the voltage. More specifically, in some embodiments, the reduction in the rising rate may be performed responsive to detecting that the voltage of bus 110 has crossed the first voltage threshold (e.g., VOL).

In some embodiments, the isolated device further comprises a second voltage limiter (e.g., 224) coupled to the second bus. In those embodiments, the controller is further configured to, responsive to a variation in a second voltage appearing at the second bus caused by opening the second switch, control the second voltage limiter to reduce a rate of the variation in the second voltage appearing at the second bus. For example, responsive to detecting a rise in the voltage of bus 112 (e.g., as discussed in connection with time t4 of FIG. 3), the controller may activate voltage limiter 224 to reduce the rising rate of the voltage.

In some embodiments, controlling the first voltage limiter to reduce the rate of the variation in the first voltage results in an extension of the time interval in which the first voltage is within a voltage dead zone defined between a first voltage threshold (e.g., VOL) and a second voltage threshold (e.g., VIL). The voltage dead zone, the first voltage threshold and the second voltage threshold are defined in accordance with a SMBus protocol or a PMBus protocol. The first voltage threshold may be between 0.2 V and 0.5 V and the second voltage threshold may be between 0.7 V and 1 V.

In some embodiments, the controller is further configured to determine whether a second external device (e.g., 20) coupled to the second bus has initiated a transmission directed to the first external device. This may involve detecting whether, throughout a time interval triggered by activation of the first voltage limiter and having a predefined duration, a second voltage appearing at the second bus has crossed a voltage threshold defined in accordance with a SMBus protocol or a PMBus protocol. For example, with reference to FIG. 4, the controller may determine whether the voltage of bus 112 has crossed the first threshold during the timeout interval defined between tC and tD.

Use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Having thus described several aspects of at least one embodiment, it is to be appreciated that various alterations, modifications, and improvements will readily occur to those skilled in the art. Such alterations, modifications, and improvements are intended to be part of this disclosure and are intended to be within the spirit and scope of the principles described herein. Accordingly, the foregoing description and drawings are by way of example only.

What is claimed is:

1. An isolated device comprising:
   a bidirectional isolated buffer having a first side and a second side;
   a first bus coupled to the first side of the bidirectional isolated buffer and a second bus coupled to the second side of the bidirectional isolated buffer;
   a first switch coupled to the first bus and a second switch coupled to the second bus;
   a first voltage limiter coupled to the first bus; and
   a controller configured to, responsive to detection of a variation in a first voltage appearing at the first bus caused by a first external device coupled to the first bus, control the first voltage limiter to reduce a rate of the variation in the first voltage appearing at the first bus.

2. The isolated device of claim 1, further comprising a second voltage limiter coupled to the second bus, wherein the controller is further configured to:
   responsive to a variation in a second voltage appearing at the second bus caused by opening the second switch, control the second voltage limiter to reduce a rate of the variation in the second voltage appearing at the second bus.

3. The isolated device of claim 1, wherein controlling the first voltage limiter to reduce the rate of the variation in the first voltage results in an extension of a time interval in which the first voltage is within a voltage dead zone defined between a first voltage threshold and a second voltage threshold, wherein the voltage dead zone, the first voltage threshold and the second voltage threshold are defined in accordance with a SMBus protocol or a PMBus protocol.

4. The isolated device of claim 3, wherein the first voltage threshold is between 0.2 V and 0.5 V and the second voltage threshold is between 0.7 V and 1 V.

5. The isolated device of claim 1, wherein the controller is further configured to determine whether a second external device coupled to the second bus has initiated a transmission directed to the first external device.

6. The isolated device of claim 5, wherein determining whether the second external device coupled to the second bus has initiated the transmission comprises:
    detecting whether, throughout a time interval triggered by activation of the first voltage limiter and having a predefined duration, a second voltage appearing at the second bus has crossed a voltage threshold defined in accordance with a SMBus protocol or a PMBus protocol.

7. The isolated device of claim 1, wherein the first voltage limiter comprises a slew rate limiting amplifier or a voltage clamp.

8. The isolated device of claim 1, wherein the bidirectional isolated buffer comprises a first isolated buffer having an input coupled to the first bus and a second isolated buffer having an input coupled to the second bus, wherein the first isolated buffer is configured to control the second switch and the second isolated buffer is configured to control the first switch.

9. The isolated device of claim 1, wherein the controller is configured to control the first voltage limiter to reduce the rate of the variation in the first voltage appearing at the first bus responsive to detecting that the first voltage has crossed a voltage threshold defined in accordance with a SMBus protocol or a PMBus protocol.

10. An isolated device comprising:
    a bidirectional isolated buffer having a first side and a second side;
    a first bus coupled to the first side of the bidirectional isolated buffer and a second bus coupled to the second side of the bidirectional isolated buffer;
    a first switch coupled to the first bus and a second switch coupled to the second bus; and
    a first voltage limiter coupled to the first bus and a second voltage limiter coupled to the second bus, wherein each of the first and second voltage limiters is configured to, upon being activated, reduce a variation rate in a voltage appearing at the respective bus.

11. The isolated device of claim 10, wherein the first voltage limiter comprises a slew rate limiting amplifier or a voltage clamp.

12. The isolated device of claim 10, wherein the bidirectional isolated buffer comprises a first isolated buffer having an input coupled to the first bus and a second isolated buffer having an input coupled to the second bus, wherein the first isolated buffer is configured to control the second switch and the second isolated buffer is configured to control the first switch.

13. The isolated device of claim 10, wherein activation of the first voltage limiter is caused by a first external device coupled to the first bus.

14. The isolated device of claim 13, wherein activation of the second voltage limiter is caused by opening of the second switch.

15. A method for controlling an isolated device having a bidirectional isolated buffer having a first side and a second side, a first bus coupled to the first side of the bidirectional isolated buffer and a second bus coupled to the second side of the bidirectional isolated buffer, a first switch coupled to the first bus and a second switch coupled to the second bus, the method comprising:
    responsive to detection of a variation in a first voltage appearing at the first bus caused by a first external device coupled to the first bus, controlling a first voltage limiter to reduce a rate of the variation in the first voltage appearing at the first bus; and
    responsive to a variation in a second voltage appearing at the second bus caused by opening the second switch, controlling a second voltage limiter to reduce a rate of the variation in the second voltage appearing at the second bus.

16. The method of claim 15, wherein controlling the first voltage limiter to reduce the rate of the variation in the first voltage results in an extension of a time interval in which the first voltage is within a voltage dead zone defined between a first voltage threshold and a second voltage threshold, wherein the voltage dead zone, the first voltage threshold and the second voltage threshold are defined in accordance with a SMBus protocol or a PMBus protocol.

17. The method of claim 16, wherein the first voltage threshold is between 0.2 V and 0.5 V and the second voltage threshold is between 0.7 V and 1 V.

18. The method of claim 15, further comprising determining whether a second external device coupled to the second bus has initiated a transmission directed to the first external device.

19. The method of claim 18, wherein determining whether the second external device coupled to the second bus has initiated the transmission comprises:
    detecting whether, throughout a time interval triggered by activation of the first voltage limiter and having a predefined duration, the second voltage has crossed a voltage threshold defined in accordance with a SMBus protocol or a PMBus protocol.

20. The method of claim 15, wherein controlling the first voltage limiter to reduce the rate of the variation in the first voltage appearing at the first bus comprises causing the first voltage to transition from a first slope to a second slope that is less than the first slope.

* * * * *